C. W. CAHOON.
Broadcast-Seeder.
No. 554.
Reissued May 11, 1858.
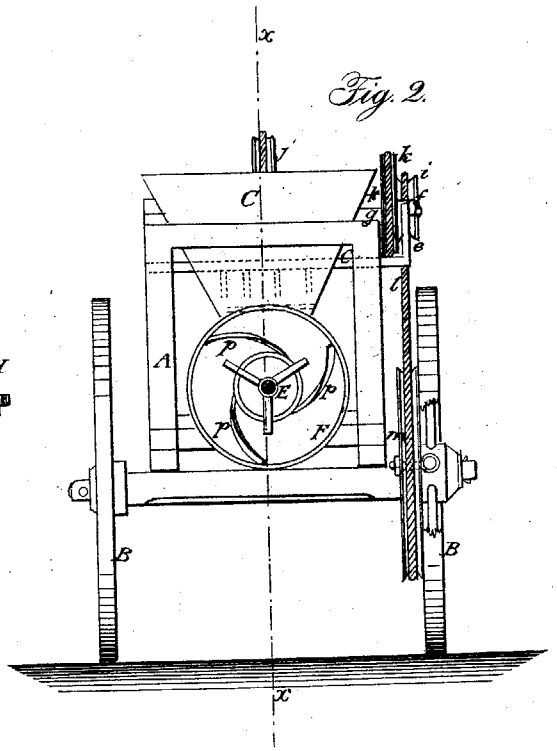
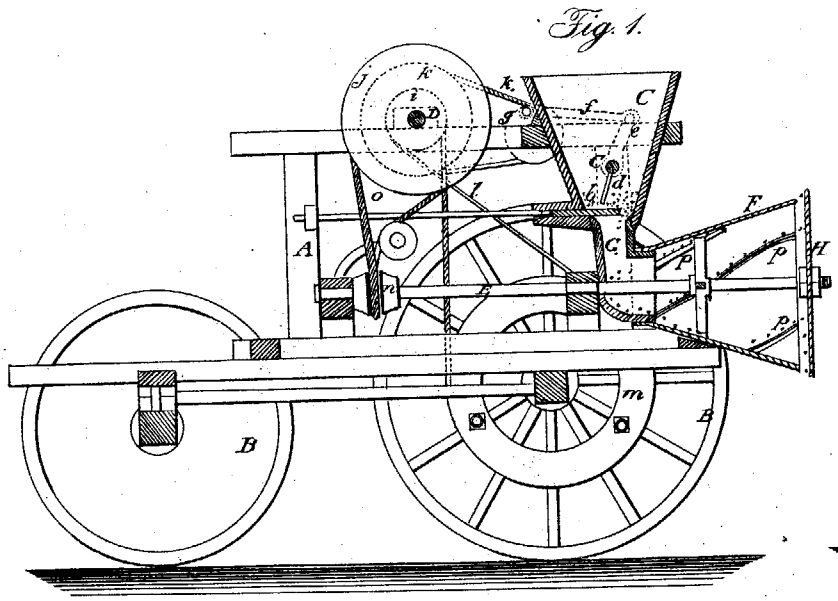
AM. PHOTO-LITHO. CO. N.Y. (OSBORNE'S PROCESS.)

UNITED STATES PATENT OFFICE.

C. W. CAHOON, OF PORTLAND, MAINE, ASSIGNOR TO J. B. CAHOON AND D. H. FURBISH, OF SAME PLACE.

IMPROVEMENT IN SEEDING-MACHINES.

Specification forming part of Letters Patent No. 18,083, dated September 1, 1857; Reissue No. 554, dated May 11, 1858.

*To all whom it may concern:*

Be it known that I, CHARLES W. CAHOON, of Brooklyn, in the county of Kings and State of New York, have invented a new and Improved Machine for Sewing Seed and Fertilizing Materials Broadcast; and I do hereby declare that the following is a full, clear, and exact description of the same, reference being had to the annexed drawings, making a part of this specification, in which—

Figure 1 is a longitudinal vertical section of my improvement, *x x*, Fig. 2, indicating the plane of section. Fig. 2 is a back view of the same.

Similar letters of reference indicate corresponding parts in the two figures.

This invention consists in the novel means employed for discharging broadcast the seed or fertilizing material. The object is attained by employing a rotating tubular chamber as a discharger, which is placed horizontally below the hopper, the hopper connecting with the discharger and arranged as will be hereinafter fully described. The rotating discharger is placed in such a position that its outer edge, from which the grain, seed, &c., are thrown, will be in a plane vertical or nearly vertical to the horizon.

To enable those skilled in the art to fully understand and construct my invention, I will proceed to describe it.

A represents a framing, which may be of rectangular form, and constructed in any proper manner to support the working parts. The framing A may be mounted on wheels B, or it may be placed within the body of an ordinary vehicle and have motion communicated to it from one of the wheels of the vehicle. I prefer, however, to have the framing mounted on wheels, as shown in the drawings.

On the upper part of the framing A a seed-hopper, C, is placed. This hopper is of the usual form, and has a slide, *b*, at its bottom, as shown in Fig. 1. Within the hopper C a rock-shaft, *c*, is placed longitudinally, and this shaft has a series of teeth, *d*, attached to it. The shaft is operated by having a crank, *e*, at one end, to which crank a connecting-rod, *f*, is attached, the connecting-rod being secured to a crank-pulley, *g*, attached to one side of the framing A.

D is a shaft, which is placed transversely on the upper part of the framing A. On one end of this shaft two pulleys, *h i*, are attached, and a pulley, *j*, is placed on the shaft at about its center. The crank-pulley *g* is driven by a belt, *k*, from the pulley *h* on the shaft D, and the shaft D is driven by a belt, *l*, from a pulley, *m*, attached to the inner side of one of the wheels B.

E represents a shaft, which is placed longitudinally in the framing A. On the outer part of the shaft E a funnel-shaped chamber, F, is secured. This chamber, which I term a "discharger," may be constructed of sheet-metal, and its back end, which has the smaller diameter, communicates with a bent tube, G, which is attached to the lower end of the hopper, as shown clearly in Fig. 1. On the inner end of the shaft E a pulley, *n*, is placed, and a belt, *o*, passes around this pulley, and also around a pulley, *j*, on the shaft D. It is obvious, however, that in place of a crank and pulley connections, for the purpose of communicating motion to the several parts of the machine, gearing and other equivalent mechanism may be employed, the means of communicating the motion necessary to work the essential parts of the machine constituting no part of its claim to novelty.

To the inner surface of the discharger F spiral flanges *p* are attached. Three are shown in the drawings; but more or less may be used, as occasion may require; and to the outer end of the shaft E a circular disk, H, is attached. This disk H is secured on the shaft a short distance from the mouth or outer end of the discharger F, and is a trifle larger in diameter than the mouth or outer end of the discharger. The flanges *p* may be of greater or less width, as desired.

The operation is as follows: The seed or other material is placed within the hopper C, and the slide *b* is drawn out to a certain distance, so as to allow the seed to pass down into the discharger F, the slide *b* regulating the flow of the seed into the discharger. As the machine is drawn along the vibrating teeth *d* agitate the seed within the hopper and prevent it from clogging or choking. A rotary motion is given the discharger F by the belt *o* from the shaft D, and the seed is thrown broadcast from the outer end of the discharger F by the revolutions of the same. The spiral flanges *p* create a current of air within the discharger, which gives an impetus to the seed. The principal office of the flanges is to intercept the direct flow of the grain, seed, &c., as it leaves the connecting-tube G, and by retaining it in the discharger until the necessary centrifugal force is communicated to it to prevent a too copious discharge of it at the lowest point of the revolving chamber. The disk H prevents the air from rushing into the mouth of the discharger, and thereby intercepting the proper discharge of the seed. Its principal office having been described, it is only necessary to remark here that its use is essential only when there is a current of wind acting against the discharger to drive the grain, seed, &c., back.

This invention is extremely simple, and the seed or fertilizing material will be discharged in a very even manner. In fact, the distribution may be nicely graduated. It possesses great advantages over shaking or reciprocating screens and similar devices which have been employed for effecting the desired result, and is also superior to the horizontal rotating wheels, which distribute or throw the seed all around in front as well as in the rear of the machine, and in those cases where the seed is prevented from being thrown in front of the implement the centrifugal force is in a measure destroyed. I would further remark that while I prefer the funnel shape for the discharger, which, with its accompanying flanges or their equivalents, gives the best result of any form of circular discharger placed in the same relations, yet I do not confine myself to that precise form, for the principle or characteristic of my invention consists in the employment of a tubular chamber or discharger with its outer end turning rapidly in a plane vertical or nearly vertical to the horizon, and thereby communicating a centrifugal motion to the grain, seed, or other material, and throwing it out from the circle formed by the outer edge or periphery of the discharger while it (the grain, seed, &c.,) is under the force of the centrifugal motion. The effect that is due to the vertical position of the circle formed by the outer edge or periphery of the discharger is a very important one, for that position, aided by the devices above described for regulating the flow of the grain, &c., when a funnel-shaped chamber is employed, enables this machine to scatter the grain, &c., with a very high degree of uniformity over a very wide path or track of ground, whether level or hilly, and thus constitutes a material improvement over previous machines for sowing grain, seed, &c., broadcast. It is, moreover, obvious that the essential and important features of this machine may be used either on a carriage drawn by any motive power and operated by the same power or by hand, or a smaller machine embracing them may be made to be carried on the person of a man, and turned by a crank by the person who carries it. In either form the operation of the machine is the same.

I do not claim the slide *b* nor the rock-shaft *c*, with teeth *d* attached, for stirring or agitating the seed within the hopper separately; neither do I claim distributing or sowing seed broadcast by means of centrifugal force effected by the rotation of wheels or cylinders, irrespective of the construction and arrangement herein shown; but,

Having thus described my invention, what I claim as new, and desire to secure by Letters Patent, is—

1. The employment of a tubular chamber or discharger rotating rapidly in a horizontal position, so that its outer edge or periphery will be in a plane vertical or nearly vertical to the horizon, and thereby communicating a centrifugal motion to the grain, seed, &c., away from the center of a circle whose plane is thus vertical or nearly vertical to the horizon.

2. The employment of a funnel-shaped discharging-chamber for the purpose and rotating in the position above described, having spiral flanges or their equivalents inserted therein, and operating to arrest the too direct flow of the grain or seed, &c., through the discharger, and retaining it therein until the necessary centrifugal force is communicated to it before it leaves the discharger, as above described.

3. The combination and use of the above-described and above-claimed tubular or funnel shaped discharging-chamber, rotating in the position above described, with the disk H, placed and operating in the manner above described.

4. The combination and use of the above-described and above-claimed tubular or funnel-shaped discharging-chamber rotating in the position above described, whether with or without the use of the disk H, with a hopper constructed of any proper material, and fitted with the slide *b* and rock-shaft *c*, with teeth *d* attached, or their equivalents, and operating substantially in the manner above described to feed the grain, seed, &c., into the discharging-chamber.

CHARLES W. CAHOON.

Witnesses:

GEO. T. CURTIS,
M. P. HAMBLIN.